United States Patent [19]
Slotkowski

[11] 3,899,770
[45] Aug. 12, 1975

[54] MULTIPLE INPUT WARNING SYSTEM FOR A MOTOR VEHICLE

[75] Inventor: Kenneth G. Slotkowski, Southfield, Mich.

[73] Assignee: Ford Motor Company, Dearborn, Mich.

[22] Filed: Apr. 1, 1974

[21] Appl. No.: 457,511

[52] U.S. Cl. .................. 340/52 F; 315/82; 315/84; 340/52 D
[51] Int. Cl.² .................. B60Q 5/00; G08B 23/00
[58] Field of Search ........ 340/52 R, 52 D, 52 F, 79; 315/77, 80, 82, 84, 130; 307/10 AT, 10 BP, 10 R

[56] References Cited
UNITED STATES PATENTS

| | | | |
|---|---|---|---|
| 2,799,843 | 7/1957 | Savino | 340/52 D |
| 3,391,302 | 7/1968 | Weingarden | 340/52 D |
| 3,566,401 | 2/1971 | Smith et al. | 340/52 F |
| 3,581,276 | 5/1971 | Newman | 340/52 D |
| 3,649,960 | 3/1972 | Severn | 340/52 D |
| 3,662,334 | 5/1972 | Susslin | 340/52 D |

Primary Examiner—John W. Caldwell
Assistant Examiner—Joseph E. Nowicki
Attorney, Agent, or Firm—Robert W. Brown; Keith L. Zerschling

[57] ABSTRACT

Multiple input warning system for a motor vehicle utilizing a single preferably audible warning device. It is actuated when a vehicle door is open and a key is in the ignition switch or when the door is open and the vehicle instrument panel lights are energized. Also, the warning device is energized if the ignition switch is in a particular position and an undesirable vehicle condition exists, such as vehicle speed in excess of a predetermined level, excessive engine coolant temperature or exhaust emission control system failure. Indicating lamps may be provided to give a visual indication of such undesirable vehicle conditions, and the multiple input system of the invention may include means for establishing the operability of the indicating lamps, without concurrent energization of the warning device, when the ignition switch is in a particular condition. Preferably, low cost integrated circuitry is utilized in the system.

10 Claims, 1 Drawing Figure

PATENTED AUG 12 1975
3,899,770
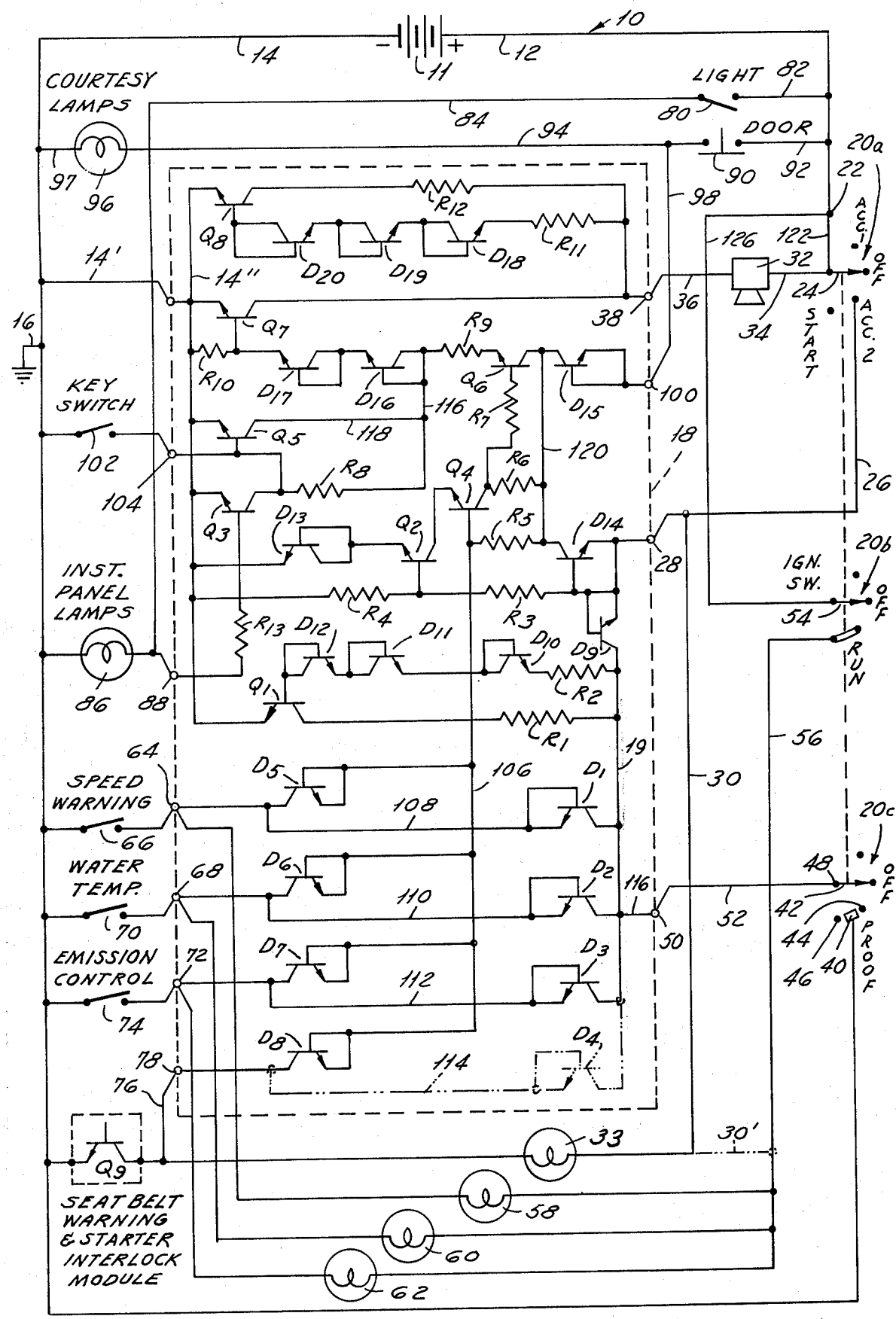

MULTIPLE INPUT WARNING SYSTEM FOR A MOTOR VEHICLE

BACKGROUND

This invention relates to a multiple input warning system for a motor vehicle and, more particularly, to a system which provides a preferably audible warning signal upon the occurrence of one or more of a number of conditions or malfunctions within the motor vehicle.

Multiple input warning systems are known in the prior art and exemplary of these are the devices and apparatus described in the following U.S. Pat. Nos. 3,665,384 to Ives; 3,641,488 to Mullin; 3,631,393 to Bennett; 3,593,264 to Atkins; and 3,566,401 to Smith et al. Of these patents, perhaps the Mullin patent should be considered the most pertinent to the present invention.

In recent years, there has been a marked increase in the number and variety of warnings of vehicle conditions or malfunctions provided to the operator of a motor vehicle. While for many years it has been common practice to provide the vehicle operator with an indication of a low oil pressure condition, a low fuel condition, vehicle speed in excess of a predetermined level, excessive engine-coolant temperature and the like, it now has or is becoming common to provide the vehicle operator with an indication of a failure in an exhaust emission control system, a failure in a vehicle brake system or a failure to properly fasten a passenger restraint system. Also, the vehicle operator may be given warning that he has left the key in the ignition switch while about to leave the vehicle or that the vehicle lights have been left on with the operator about to depart. With respect to some or all of these operator warnings, it is desirable to provide not only an indicating lamp or gauge display of a vehicle condition or malfunction, but also a more obtrusive warning, such as may be produced by an audible warning device such as a buzzer or tone generator.

Where indicating lamps are used to provide a warning function when a vehicle condition or malfunction occurs, it is generally desirable to provide circuitry for proofing (establishing the operability of) the individual indicating lamps. Typically, such proofing is accomplished through the ignition switch which, when in a particular positional condition, applies the vehicle DC source potential across the indicating lamps to be proofed. During such proofing, it is desirable not to actuate an audible warning device because to do so would prove to be an annoyance to the vehicle operator. Also, in certain indicating lamp functions, such as the alternator warning function and the low oil pressure warning function, proofing occurs automatically because the indicating lamp displays a malfunction condition when the ignition switch is in an "on" or "run" positional condition and the vehicle's engine is not running.

SUMMARY OF THE INVENTION

It is an object of the invention to provide a single and preferably audible warning device capable of being energized by the application of a DC potential across its terminals upon the occurrence of a particular vehicle condition or malfunction sensed by one or more of a plurality of input signals or condition indicating devices.

Another object of the present invention is to provide a warning to a vehicle operator upon the opening of a door of the vehicle when either the key has been left in the ignition switch of the vehicle or the vehicle lights have been left on.

A more specific object of the invention is to provide a warning signal, in addition to the illumination of an indicating lamp, upon the occurrence of an overspeed vehicle condition, an excessive water or engine coolant temperature condition in the vehicle's engine, a failure in the vehicle emission control system, the failure of the vehicle operator or a passenger within the vehicle to properly fasten a seatbelt or other passenger restraint system or some other undesirable vehicle condition.

A further object of the invention is to provide circuitry for proofing certain of the indicating lamps which may be used in a motor vehicle, and preferably, to do so in the absence of the actuation of the warning device.

An additional object of the invention is to provide circuitry capable of producing an audible or other warning more obtrusive than that given by an indicating lamp, to use one warning device for a plurality of warning functions and to provide a system which easily accommodates the addition of new warning functions.

These and other objects of the invention may be better understood by reference to the detailed description which follows and to the drawing which is a schematic diagram of an embodiment of a multiple input audible warning system for a motor vehicle in accordance with the teachings of the present invention.

DETAILED DESCRIPTION

With reference now to the drawing, there is shown a schematic diagram, generally designated by the numeral 10, of a multiple input audible warning system for a motor vehicle.

The circuitry 10 includes a DC source of electrical potential, such as a vehicle storage battery 11, having a lead 12 connected to its positive terminal and a lead 14 which is connected to ground potential at 16. Circuitry, comprising resistors, diodes and transistors, is shown enclosed within the broken line perimeter 18. The circuitry within the broken line boundary 18 is schematically illustrated in a form particularly suitable for integrated circuit construction. This circuitry, hereinafter referred to as integrated circuit 18, is comprised entirely of resistors and NPN transistors many of which are connected as diodes. Thus, the integrated circuit 18 contains, for example, a diode D1 formed from a transistor having its base and emitter electrodes connected together, short-circuiting the base-emitter junction of the transistor, and having its collector connected to lead 19. The base of the diode D1 is formed from p-type semiconductor material whereas its collector is formed from n-type material. Thus, the base-emitter connection of the diode D1 is the anode and the collector is the cathode of a PN junction diode. Diodes of this connection configuration hereinafter are referred to as collector diodes.

The diode D10 also is formed from a transistor, but it has its base electrode connected to its collector electrode and its emitter is free for connection to other circuitry. In this connection configuration, hereinafter referred to as an emitter diode, the base-collector connection is the anode of a PN junction diode and the transistor's emitter is the cathode of the diode.

The circuitry 10 includes ganged switches 20a, 20b, and 20c which together form the vehicle ignition switch. These ganged switches hereinafter are collectively referred to as ignition switch 20.

The voltage supply lead 12 from the storage battery 11 is divided at a junction 22 into voltage supply leads 122 and 126. Voltage supply lead 122 is connected to the movable arm 24 of the switch 20a. The switch 20a has arm positions designated "accessory-1," "off," "accessory-2" and "start." The accessory-2 pole-position of switch 20a is of particular interest with respect to its use in the circuitry 10. A lead 26 from this accessory-2 switch pole supplies electrical potential to a terminal 28 of the integrated circuit 18 when the movable arm 24 of the switch 20a is in the accessory-2 positional condition. Under such circumstances, this electrical potential on the lead 26 also is supplied via a lead 30 to an indicating lamp 33. The indicating lamp 33 is connected in series with the collector-emitter output circuit of a transistor Q9 located in a seatbelt warning and starting interlock module (not shown). The transistor Q9 output circuit is conductive under circumstances controlled by the seatbelt warning and starter interlock module.

An audible warning device 32, which may be a buzzer or tone generator or the like and which is electrically actuable by the application of a DC electrical potential across its terminals, has one of its terminals connected by a lead 35 to the movable arm 24 of the switch 20a. The other terminal of the audible warning device is connected by a lead 36 to a terminal 38 of the integrated circuit 18.

With respect to the physical configuration of the various parts in the circuit 10, it is contemplated that the integrated circuit 18 and the audible warning device 32 would be housed within a single structure and the remaining vehicle storage battery, indicating and other lamps and the various switches of the circuit 10 would be appropriately located in various parts of the motor vehicle. The housing in which the integrated circuit 18 and the audible warning device 32 would be located preferably would include a plug receptacle for receiving a wiring harness having lead wires connected to the various lamps, switches, and other devices in the circuit 10. It should be noted that a ground lead wire 14' interconnects the ground voltage supply lead 14 with a ground voltage supply lead 14" located within the integrated circuit 18. Also, it should be noted that the ground voltage supply lead 14 continues, along the bottom and lower right side of the schematic diagram, to a termination point at a proof pole 40 in the ignition switch 20c.

The switch 20c has a movable arm 42. The movable arm 42 is at the point 44 when the movable arm 24 of the switch 20a is in the accessory-2 position. Also, the movable arm 42 makes electrical contact with the proof pole 40 when the movable arm 24 of switch 20a is located in a position between the accessory-2 and start positions. The pole 48 at the lower end of the movable arm 42 supplies the ground potential on the voltage supply lead 14 to a terminal 50 via a lead 52 when the movable arm 42 is in contact with the proof pole 40 of the switch 20c. If desired, the proof pole 40 may be a conductive element extending over to a point 46, the point 46 being the position of the movable arm 42 when the movable arm 24 of the switch 20a is in the start position. If the proof contact 40 extends to the point 46, then proofing of the various indicating lights hereinafter described occurs not only as the ignition switch 20a moves between the accessory-2 and start positions, but also when the ignition switch 20a is in the start position to cause cranking of the vehicle's engine.

The voltage supply lead 126 connects the positive side of the DC source of electrical potential 11 to a movable arm 54 of the switch 20b. When the movable arm 54 is in the run position, the positive DC electrical potential is applied to a supply lead 56. The movable arm 54 is in the run position whenever the movable arm 24 of the switch 20a is in the accessory-2 or start positions or in any position therebetween.

Vehicle condition or malfunction indicating lamps 58, 60 and 62 are connected to the supply lead 56. Typically, the indicating lamps would be small and located in the vehicle's instrument panel. The indicating lamp 58 is connected to a terminal 65 in the integrated circuit 18 and is connected in series with a normally open vehicle-overspeed-warning switch 66. The speed warning switch 66 has one of its poles connected to the ground voltage supply lead 14, and this switch closes when the vehicle exceeds a predetermined speed to provide the vehicle operator with a warning of such condition. The indicating lamp 60, similarly, is connected to a terminal 68 in the integrated circuit 18 and is connected in series with a normally open water or engine coolant temperature-sensing switch 70. The switch 70 closes when water temperature exceeds a predetermined level; this switch 70 also has one of its poles connected to the ground voltage supply lead 14. The indicating lamp 62 is connected to a terminal 72 in the integrated circuit and is connected in series with a switch 74 having one of its poles connected to the ground lead 14. The switch 74 closes in the event there is a malfunction in the emission control system of the motor vehicle. Of course, the previously described transistor Q9 has its output circuit connected in series with the indicating lamp 33; the junction formed between these series-connected elements is connected by a lead 76 to a terminal 78 in the integrated circuit 18.

The switches 66, 70, 74 and the switching transistor Q9, in a seatbelt warning and starter interlock system, illustrate various vehicle conditions or malfunctions for which sensing may be desirable and for which the provision of an audible warning may be desirable. Of course, other vehicle conditions or functions may be sensed in a similar manner.

A normally open light switch 80 has one of its poles connected by a lead 82 to the positive voltage supply lead 12 and has its other pole connected by a lead 84 to one or more vehicle instrument panel lamps, collectively and severally indicated at 86. The light switch 80 and the instrument panel lamps 86 are connected in series and across the voltage supply leads 12 and 14; the junction formed between the series-connected light switch 80 and instrument panel lamps 86 is connected to a terminal 88 in the integrated circuit 18.

A door switch 90, which is open and nonconductive when a vehicle door, such as the vehicle operator's door, is closed and which is closed and conductive when the vehicle operator's door is open, is connected by a lead 92 to the voltage supply lead 12. The opposite pole of the door switch 90 is connected by a lead 94 to vehicle courtesy lamps, collectively and severally indicated at 96, which are also connected at 97 to the ground lead 14. Thus, the door switch is connected in series with the vehicle courtesy lamps, which lamps typically are located within the vehicle passenger compartment to provide light therein when one or more of the vehicle's doors are opened. The junction formed between the door switch 90 and the courtesy lamps 96 is connected by a lead 98 to a terminal 100 in the integrated circuit 18.

A normally open key switch 102 has one of its poles connected to the ground voltage supply lead 14 and has its opposite pole connected to a terminal 104 in the integrated circuit 18. The ignition switch 20 is key-operated, that is, it is key-operated either in the sense that the insertion of a key into the ignition switch and rotation thereof moves the movable arms 24, 54 and 42 of the ignition switch or in the sense that the movable arms of the ignition switch cannot be moved unless a key has been inserted in a lock located in the vehicle. The key switch 102 merely senses the presence of the key in the ignition switch or in such lock, which for the purposes of this patent application is to be regarded as a part of the ignition switch. The key switch 102 is closed and conductive when a key is inserted within the ignition switch and is open and nonconductive in the absence of such key in the ignition switch.

The respective junctions 64, 68, 72 and 78 are connected, respectively, through collector diodes D5, D6, D7 and D8 to a lead 106. These terminals also are connected, respectively, by lead 108 and collector diode D1, lead 110 and collector diode D2, lead 112 and collector diode D3, and lead 114 and collector diode D4, to the lead 19, which in turn, is connected by a lead 116 to the terminal 50. The collector diodes D1 through D4 are isolation diodes as are the collector diodes D5 through D8. The function of the isolation diodes D1 through D8 is to prevent, when the movable arm 54 of the ignition switch 20b is in the run position, the simultaneous energization of all of the indicating lamps 33, 58, 60 and 62 when only one of the switches 66, 70, 74 and $Q_9$ is conductive. The function of these switches is to place the lead 106 at substantially ground potential (ignoring the voltage drop across the diodes D5 through D8) when any of the switches is conductive. The function of the switch 20c when the movable arm 42 thereof is in contact with the proof pole 40 is to place the terminals 64, 68 and 72 at substantially ground potential or, in other words, to complete a circuit to ground such that current can flow from the run pole of the ignition switch 20b, through the lead 56 and the indicating lights 58, 60 and 62 to ground at the proof contact 40 via lead 108 and diode D1 for indicating lamp 58, via lead 110 and diode D2 for indicating lamp 60 and via lead 112 and diode D3 for indicating lamp 62. Of course, the current flow also occurs in the lead 116, the lead 52, and the movable arm 42 of the switch 20c prior to reaching the proof contact 40. This energizes the indicating lamps 58, 60 and 62 to provide proofing thereof.

In connection with the proofing described in the preceding paragraph, it should be noted that the indicating lamp 33 is not proofed because it is connected by the leads 30 and 26 to the accessory-2 pole of the ignition switch 20a. When the movable arm 42 of the switch 20c is in contact with the proof contact 40, the movable arm 24 of the switch 20a is located between the accessory-2 and start terminals of the switch 20a and the electrical potential on the voltage supply lead 112 is not applied at such time to the accessory-2 pole. If the indicating lamp 33 is connected by the lead 30 as shown, then the lead 114 and the diode D4 are unnecessary and hence are drawn in the circuitry 10 as dot-dash lines to so indicate. With the indicating lamp 30 connected to the lead 26 as shown, the indicating lamp 33 is energized only when the movable arm 24 of the switch 20a is in the accessory-2 position and the transistor $Q_9$ output circuit is conductive. If it is desired to have the indicating lamp 33 energized when the output circuit of the transistor $Q_9$ is conductive and the movable arm 54 of the ignition switch 20b is in the run position, then the lead 30 may be connected as indicated at 30'. Further, if it is desired to provide proofing for the indicating lamp 33, then the lead 114 and the diode D4 would be connected as shown in the drawing. Also, the indicating lamp 33 and the switching device $Q_9$ controlling it could have a warning function other than seatbelt warning.

The terminal 28 of the integrated circuit 18 is connected through a collector diode D9 to the lead 19. When the terminal 28 is supplied with the positive DC electrical supply potential from the switch 20a accessory-2 pole, the diode D9 is forward biased and this potential is applied to the lead 19. A resistor $R_1$ has one of its leads connected to the lead 19 and has its other lead connected to the collector of a transistor $Q_1$, the emitter of which is connected to the ground lead 14''. The base of the transistor $Q_1$ is connected through series-connected emitter diodes D12, D11 and D10 to one terminal of a resistor $R_2$, the other terminal of which is connected to the lead 19. The emitter diodes D12, D11 and D10 are used as zener diodes having a reverse breakdown voltage of, for examples, seven volts, as is common for integrated circuit diodes. When the total zener breakdown voltage of these diodes, 21 volts, occurs on the lead 19, base drive is supplied to the transistor $Q_1$ and its collector-emitter output circuit is conductive providing a current path through the resistor $R_1$ and providing transient protection for transistors $Q_2$, $Q_3$ and $Q_4$ hereinafter described.

The terminal 28 also is connected through a collector diode D14 to one terminal of a current limiting resistor $R_5$ the other terminal of which is connected to the lead 106. The lead 106 is connected to the base of a transistor $Q_4$ the collector of which is connected through a current limiting resistor $R_6$ to the cathode (collector) of the diode D14. The emitter of the transistor $Q_4$ is connected to the collector of a transistor $Q_2$ the base of which is connected to the junction formed between a resistor $R_3$ and a resistor $R_4$, these resistors forming a voltage divider connected between the terminal 28 and the ground lead 14''. The emitter of the transistor $Q_2$ is connected through an emitter diode D13 to the ground lead 14''. The collector of the transistor $Q_4$ is connected through a current limiting resistor $R_7$ to the base of a transistor $Q_6$. The collector of the transistor $Q_6$ is connected through a collector diode D15 to the terminal 100.

At this point, it may be noted that voltage is supplied to the terminal 100 via the lead 98 when the door switch 90 is closed and that voltage is supplied to the terminal 28 when the movable arm 24 of the ignition switch 20a is in the accessory-2 position. The diodes D14 and D15 thus are isolation diodes; the diode D14 prevents the voltage at the terminal 100 from being applied to the terminal 28 and the diode D15 prevents the voltage at the terminal 28 from being applied at the terminal 100. Of course, the supply voltage could be applied simultaneously to each of the terminals 28 and 100.

The emitter of the transistor $Q_6$ is connected through a current limiting resistor $R_9$ and series-connected emitter-diodes D16 and D17 to the base of the transistor $Q_7$. A resistor $R_{10}$ is connected between the base of the transistor $Q_7$ and the ground lead 14''. The junction formed between the resistor $R_9$ and the anode (collector) of the diode D16 is connected via a lead 116 and a lead 118 to the collector of a transistor $Q_5$. The emitter of the transistor $Q_5$ is connected to the ground lead 14''.

The base of the transistor $Q_5$ is connected to the terminal 104 to which the key switch 102 also is connected, and the base of this transistor also is connected to the collector of a transistor $Q_3$ the emitter of which is connected to the ground lead 14''. A current limiting resistor $R_8$ is connected between the collector of the transistor $Q_3$ and the junction formed between the resistor $R_9$ and the anode of the diode D16. The base of the transistor $Q_3$ is connected through a current limiting resistor $R_{13}$ to the terminal 88 connected to the junction formed between the light switch 80 and instrument panel lamps 86.

The transistor $Q_7$ is a solid-state switching device having an output circuit, comprising its collector-emitter circuit, which is connected in series with the audible warning device 32 by virtue of the connection of the collector of the transistor $Q_7$ to the terminal 38 and the connection of its emitter to the ground lead 14''. When the transistor $Q_7$ receives a predetermined positive signal level at its base electrode, its collector-emitter output circuit becomes fully conductive resulting in the application across the audible warning device 32 of the potential difference between the voltage supply leads 122 and 14''. This, of course, energizes the audible warning device 32 to warn the vehicle operator of the occurrence of a vehicle condition or malfunction which may also be indicated specifically by the energization of one of the indicating lamps 32, 58, 60 or 62.

Transient protection for the transistor $Q_7$ is provided by the transistor $Q_8$ which has its collector-emitter circuit connected in series with a current limiting resistor $R_{12}$ one terminal of which is connected to the terminal 28. A series-connected circuit including emitter diodes D20, D19, D18 and a resistor $R_{11}$ is connected between the base of the transistor $Q_8$ and the terminal 38. The emitter diodes are used as zener diodes and have a reverse breakdown voltage of about 7 volts in typical integrated circuits of this type. As connected, a transient voltage in excess of about 21 volts at the terminal 38 breaks down the diodes D20, D19 and D18 to supply the base drive to the transistor $Q_8$ which then becomes conductive in its collector-emitter output circuit. This provides a conductive path through the resistor $R_{12}$ between the terminal 38 and the ground lead 14''.

In the operation of the circuitry 10, the integrated circuit 18 constitutes circuit means for applying an electrical potential difference, derived from the voltage supply lead 12 and the ground voltage supply lead 14, across the terminals of the audible warning device 32. This electrical potential difference is applied across the audible warning device when the key switch 102 is in a conductive state and the door switch 90 is closed; when the ignition switch 20a has its movable arm 24 in contact with the accessory-2 pole and any one of the indicating lamps 33, 58, 60 and 62 is energized; and when the instrument panel illuminating lamps 86 are energized and the door switch 90 is closed.

With respect to the case in which the ignition switch 20a has its movable arm 24 in contact with the accessory-2 pole, thereby, to supply potential to the terminal 28, it may be seen that the transistor $Q_4$, connected as an emitter follower, is conductive in its output circuit provided the lead 106 to its base is not connected to ground potential through the switches 66, 70, 74 or through the transistor $Q_9$ output circuit. Because the transistor $Q_2$ receives its base drive from the voltage divider formed from the resistors $R_3$ and $R_4$, the transistor $Q_2$ then is conductive in its collector-emitter output circuit and the current flows from the terminal 28 through the diode D14 and resistor $R_6$, transistors $Q_4$ and $Q_2$ and through the diode D13 to the ground lead 14''. With the transistors $Q_4$ and $Q_2$ conductive in their output circuits, the collector of the transistor $Q_4$ is only slightly above ground potential. This collector voltage applied through the resistor $R_7$ to the base of the transistor $Q_6$ maintains transistor $Q_6$ nonconductive in its collector-emitter output circuit. This open output circuit of the transistor $Q_6$ blocks current flow through the diode D14 and the lead 120 to the base of the transistor $Q_7$.

Thus, the transistor $Q_7$ is nonconductive in its collector-emitter output circuit and there is no electrical potential applied across the audible warning device 32.

Should, however, one of the switches 66, 70, 74 or the switching transistor $Q_9$ become closed or conductive, then the lead 106 is at one diode drop above ground potential. This potential is applied to the base of the transistor $Q_4$ rendering it nonconductive in its output circuit. With the potential of the DC source 11 applied to the terminal 28 of the integrated circuit 18, this potential, minus the voltage drop across the diode D14, is applied to the lead 120 and the transistor $Q_6$, connected as an emitter follower, is conductive in its collector-emitter output circuit. This permits current flow from the terminal 28, through the diode D14 and the lead 120, and through the transistor $Q_6$ output circuit to the upper terminal of the resistor $R_9$. The current flow continues through the resistor $R_9$ and the series-connected diodes D16 and D17 to the base of the transistor $Q_7$. This current divides, a first portion of it flowing to ground through the resistor $R_{10}$ and a second portion providing the base drive for the transistor $Q_7$ to render it fully conductive in its collector-emitter output circuit. This causes the potential on the voltage supply leads 12 and 14 to be applied across the terminals of the audible warning device 32 to provide the driver with a warning preferably more obtrusive than that provided by the energization of the indicating lamps 33, 58, 60 or 62. When one of the switches 66, 70 or 74 or the transistor $Q_9$ is conductive, current flows from the lead 56, through one of the indicating lamps and the switch, to the ground lead 14. This energizes the indicating lamp and provides the vehicle operator with a visual indication of a specific vehicle condition or malfunction. Of course, an audible warning may be provided without a concurrent visual indication by the use of any of these switches in the absence of the indicating lamp.

Consideration now may be given to the case wherein the ignition switch 20 has its movable arms 24, 54 and 42 in the respective positions shown in the drawing and wherein all of the switches 66, 70, 74 and the transistor $Q_9$ are nonconductive. Also, it may be assumed that a key has been left in the ignition switch such that the key switch 102 is closed and conductive. In such case, the terminal 104 is connected to the potential of ground lead 14. As a result, the base of the transistor $Q_5$ is connected to ground potential and is nonconductive in its output circuit. This permits the lead 116 to be at some potential other than ground potential. When the door of the vehicle is opened, the door switch 90 closes and the potential on the voltage supply lead 12 is applied to the terminal 100 of the integrated circuit. This potential, minus the voltage drop across the diode D15, is applied to the lead 120 and the transistor $Q_6$ is conductive in its collector-emitter output circuit as a result of the bias voltage applied to its base through the resistors $R_6$ and $R_7$. Current then flows from the terminal 100, through the diode D15 and the output circuit of the transistor $Q_6$, through the resistor $R_9$ and the series-connected diodes D16 and D17, to the base of the transistor $Q_7$ to render it conductive in its output circuit. Again, this applies the electrical potential difference of voltage supply leads 12 and 14 across the terminals of the audible warning device 32 to provide an audible warning to the vehicle operator that the door has been opened and something is awry. His visual inspection of the ignition switch will reveal the presence of the key therein. The removal of the key from the ignition switch places the base of the transistor $Q_5$ at a potential sufficient to provide the base-emitter current required to render this transistor conductive in its collector-emitter output circuit. This provides a short-circuit path between the lead 116 and the ground lead 14'' that shunts the base-emitter circuit of the transistor $Q_7$. Thus, the transistor $Q_7$ is rendered nonconductive in its output circuit upon the removal of the key from the ignition switch and the audible warning device 32 is de-energized.

Let it be assumed now that the ignition switch 20 is in the position indicated in the drawing and that the light switch 80 is closed and conductive to supply the potential on voltage supply lead 12 to the instrument panel lamps which thereby are energized. In such case, the potential of the voltage supply lead 12 is applied to the terminal 88 of the integrated circuit and through the current limiting resistor $R_{13}$, to the transistor $Q_3$ to supply its base drive and to render it conductive in its output circuit. The closure of the door switch 90, which occurs when the door is opened, supplied the source potential to the terminal 100 and current flows through the diode D15 and the output circuit of the transistor $Q_6$, which is fully conductive, to the lead 116, which is connected through the resistor $R_8$ to the collector of the transistor $Q_3$. With the transistor $Q_3$ conductive in its output circuit, the base of the transistor $Q_5$ is connected to the potential of the ground lead 14'' (ignoring the saturation collector-emitter voltage of the transistor $Q_3$). As a result, the transistor $Q_5$ is nonconductive in its collector-emitter output circuit and the lead 116 may be at some other potential. This potential is determined by the current flow from the terminal 100 through the diode 15, the transistor $Q_6$ and the resistor $R_9$. Current flow continues through the diodes D16 and D17 to the base of the transistor $Q_7$ which is then fully conductive in its output circuit again to apply the potential of the voltage supply leads 12 and 14 across the audible warning device 32. Thus, the vehicle operator is warned upon opening the vehicle door that something is awry. An inspection of the vehicle interior will reveal that the instrument panel lights have been left on. In most vehicles, this would also indicate that some or all of the vehicle's exterior lights have been left on.

Based upon the foregoing description of the invention, what is claimed is:

1. A multiple input warning system for a motor vehicle, said motor vehicle including:
   a. a DC source of electrical potential;
   b. first and second voltage supply leads connected to opposite terminals of said DC source of electrical potential;
   c. a warning device electrically actuable upon the application of an electrical potential difference across its terminals;
   d. a door on said vehicle;
   e. a switch controlled by the opening and closing of said door, said switch being nonconductive when said door is closed and conductive is open; said door isopen;
   f. an instrument panel lamp;
   g. a light switch, coupled to said instrument panel lamp, for controlling the supply of electrical potential to said instrument panel lamp;
   h. an ignition switch operated by the insertion in it of a key, said ignition switch including a key switch for sensing the presence of a key in said ignition switch, said key switch having a first state of conductivity when a key is in said ignition switch and a second state of conductivity in the absence of a key in said ignition switch, said ignition switch being connected to said first lead and having an electrical pole, said ignition switch having a condition wherein said first voltage supply lead is connected to said pole;
   i. an indicating lamp; and
   j. a switching device connected in series with said indicating lamp, a junction thereby being formed between said switching device and said indicating lamp, said series-connected indicating lamp and switching device being connected, through said ignition switch, across said first and second voltage supply leads when said ignition switch is in said condition; wherein the improvement comprises:
   k. circuit means, coupled to said second voltage supply lead, to said pole of said ignition switch, to the junction formed between said series-connected indicating lamp and switching device, to said door switch, to said light switch, to said key switch and to said warning device, for applying an electrical potential, derived from said first and second voltage supply leads, across terminals of said warning device: when said key switch is in its first state of conductivity, said ignition switch is not in said condition and said door switch is closed; when said ignition switch is in said condition and said indicating lamp is energized; and when said instrument panel lamp is energized, said ignition switch is not in said condition and said door switch is closed.

2. A system as in claim 1, wherein said circuit means includes a transistor having an output circuit connected in series with said warning device and having a control electrode, said output circuit controlling the application of said electrical potential across terminals of said warning device, said control electrode controlling the conductivity of said output circuit and being coupled to said first voltage supply lead through said door switch and through said ignition switch.

3. A system as in claim 2, wherein said circuit means includes a second transistor having a control electrode coupled to said key switch and having an output circuit coupled to said control electrode of said first-mentioned transistor, the output circuit of said second transistor having a state of conductivity which prevents said output circuit of said first-mentioned transistor from being fully conductive.

4. A system as in claim 3, wherein said circuit means includes a third transistor having a control electrode coupled to said light switch and having an output circuit coupled to said control electrode of said second transistor, said thrid transistor when conductive in its output circuit preventing full conductivity in said output circuit of said second transistor.

5. A system as in claim 1, wherein said ignition switch has a second pole which is connected to said second voltage supply lead, wherein said ignition switch has a second condition and wherein said circuit means further includes conductive means for proofing said indicating lamp, said conductive means connecting the junction formed between said series-connected indicating lamp and switching device to said second pole of said ignition switch when said ignition switch is in its second condition.

6. A system as in claim 5: (1) wherein said circuit means comprises a solid-state switching device having an output circuit coupled to said warning device to control the application across the terminals of said warning device of said derived electrical potential, said solid-state switching device having a control electrode the electrical potential at which determines the state of conductivity of said output circuit; and (2) wherein said control electrode is coupled to said first voltage supply lead through ignition switch and said ignition switch forms an open circuit between said control electrode and said first voltage supply lead when said ignition switch is in its second condition, thereby, to prevent the supply of electrical potential to said control electrode via said ignition switch when said ignition switch is in its second condition.

7. A system as in claim 6, wherein said solid-state switching device is a transistor, having collector, emitter and base electrodes, said output circuit being the collector-emitter electrodes of said transistor, said collector and emitter electrodes being connected in series with said warning device, said controlled electrode being the base electrode of said transistor, said circuit means further comprising means for coupling said transistor base electrode to said first voltage supply lead through a first diode and a second diode and through said door switch.

8. A system as in claim 7, wherein said circuit means includes a second transistor having a control electrode coupled to said key switch and having an output circuit coupled to said control electrode of said first-mentioned transistor, said output circuit of said second transistor having a state of conductivity which prevents said output circuit of said first-mentioned transistor from being fully conductive.

9. A system as in claim 8, wherein said circuit means includes a third transistor having a control electrode coupled to said light switch and having an output circuit coupled to said control electrode of said second transistor, said third transistor when conductive in its output circuit preventing full conductivity in said output circuit of said second transistor.

10. A system as in claim 9, wherein said circuit means further includes a fourth transistor having a control electrode coupled to said junction formed between said series-connected indicating lamp and switching device, said fourth transistor having an output circuit coupled to said control electrode of said first-mentioned transistor and to said ignition switch, said switching device and said ignition switch together having conditions permitting said output circuit of said fourth transistor to be conductive and said output circuit of said first-mentioned transistor being nonconductive when said output circuit of said fourth transistor is conductive.

* * * * *